No. 743,585. PATENTED NOV. 10, 1903.
S. B. STORER.
MAGNETIC SPEED INDICATOR.
APPLICATION FILED JAN. 3, 1903.
NO MODEL.
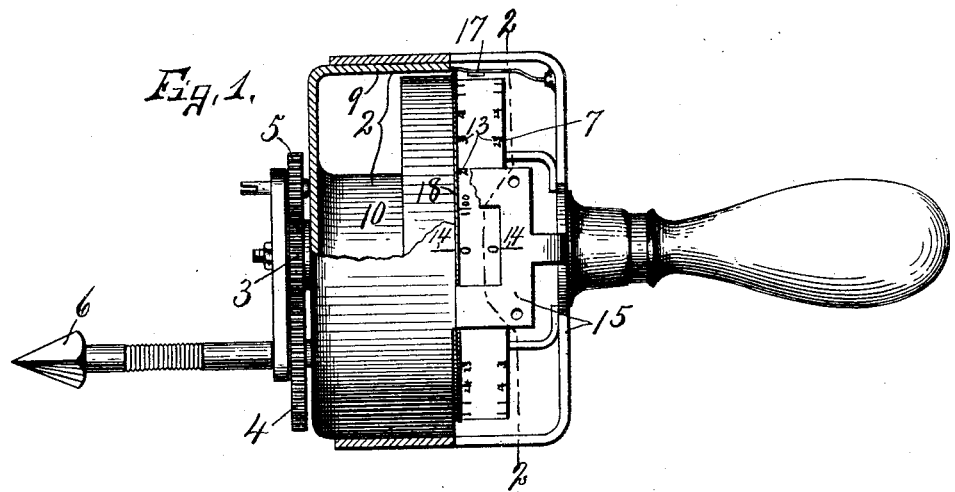
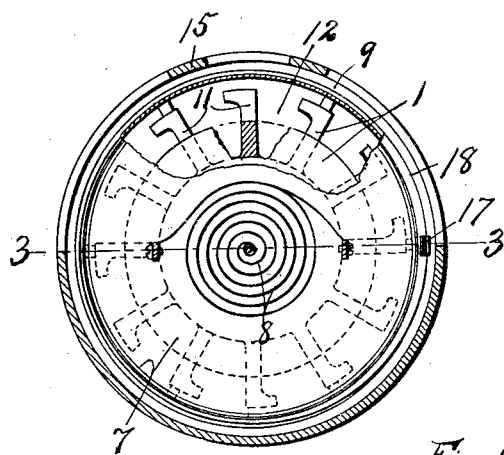
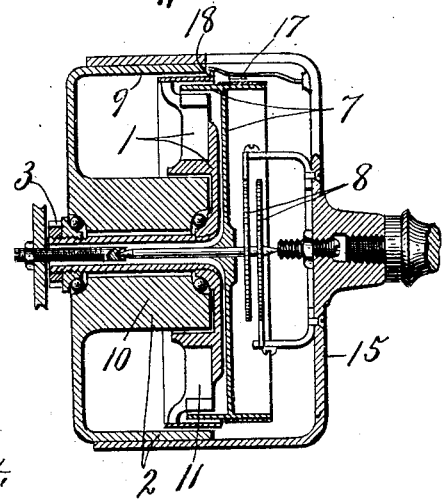
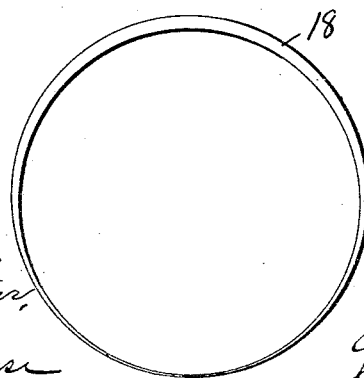
WITNESSES:
INVENTOR
Simon B. Storer
BY
Howard P. Denison
ATTORNEYS.

No. 743,585. Patented November 10, 1903.

UNITED STATES PATENT OFFICE.

SIMON B. STORER, OF SYRACUSE, NEW YORK.

MAGNETIC SPEED-INDICATOR.

SPECIFICATION forming part of Letters Patent No. 743,585, dated November 10, 1903.

Application filed January 3, 1903. Serial No. 137,747. (No model.)

*To all whom it may concern:*

Be it known that I, SIMON B. STORER, of Syracuse, in the county of Onondaga, in the State of New York, have invented new and useful Improvements in Magnetic Speed-Indicators, of which the following, taken in connection with the accompanying drawings, is a full, clear, and exact description.

This invention relates to improvements in magnetic speed-indicators in which a conductor of low resistance is located in the field of a permanent magnet and one of the elements rotated relatively to the other by a revolving member, the speed of which is to be determined. This produces a certain drag in the magnetic field which is utilized to influence the movement of a normally counterpoised oscillatory element also located in the field and provided with graduations movable relatively to a fixed point, whereby the degree of such influence is accurately measured, it being understood that the degree of magnetic pull on the oscillatory element is proportionate to the speed of the rotating element. The drag of the field acts inductively and instantly upon the oscillatory member to draw it from its position of rest, and it is found that the momentum of the oscillatory member, together with the counteracting influences, produces an instability in its movement to and from the position of rest; and the object of the present invention is to obviate this instability or excessive vibration of the oscillatory member.

Referring to the drawings, Figure 1 is a face view, partly broken away, of a magnetic speed-indicator, showing the application of a damping device thereto. Figs. 2 and 3 are sectional views taken, respectively, on lines 2 2, Fig. 1, and 3 3, Fig. 2. Fig. 4 is an end view of the detached rotary eccentric. Fig. 5 is a perspective view of the tappet or damping device.

Similar reference characters indicate corresponding parts in all the views.

In the drawings I have shown a magnetic speed-indicator similar to that set forth in my Patent No. 680,988, of September 20, 1901, and in which a low-resistance conductor 1 is rotated in the field of a permanent magnet 2 through the medium of intermeshing gears 3, 4, and 5 and a spur 6, which is applied in the usual manner to the revolving part, the speed of which is to be ascertained.

An oscillatory member 7, of suitable conductive material, is counterpoised within the magnetic field and is adapted to be drawn in either direction from its position of rest by the drag of the magnetic field due to the rotation of the conductor 1, the magnetic current acting inductively on the member 7 to move it in the direction of rotation of said conductor 1.

A biasing or counterpoising device 8, consisting of oppositely-acting light coil-springs, operates to hold the oscillatory member in a normal position of rest when not influenced by the drag of the field.

The magnet 2 usually consists of a cylindrical shell, of suitable magnetizable material, having outer and inner concentric flanges 9 and 10, which form the poles of the magnet, and the rotary conductor 1 is journaled centrally in this shell and is provided with radial arms 11, the outer ends of which are separated for forming gaps 12, whereby the continuity of the magnetic lines of force from one pole to the other are broken or diverted from radial lines, and therefore produces the field drag, which acts inductively on the member 7 to draw it from its normal position of rest.

The oscillatory member 7 is usually provided with peripheral graduations 13, which are adapted to register with a fixed point 14 upon a suitable case 15, whereby the degree of magnetic pull exerted on the member 7 is indicated, the case being held stationary by a suitable handle 16 in the hand of the operator.

The damping means for preventing excessive or undue vibration or oscillation of the member 7 is shown in the drawings as consisting of a tappet or contact device 17, acting intermittently and radially on the periphery of the member 7 and controlled by a revolving eccentric 18, which is secured by soldering or otherwise to arms 18' on the rotating member 1. This tappet is spring-actuated into contact with the member 7 and is intermittently forced out of contact with said member by the revolution of the eccentric upon which the tappet-support rides.

The member 1 is adapted to be rotated in either direction, according to the direction of rotation of the revolving part with which the spur 6 is engaged, and this spur may be attached to either of the spindles of the gears 4 or 5, which are of different diameters, and both mesh with the gear 3, the gear 4 being for low-speed tests and the other gear, 5, for high-speed tests.

In the operation of the indicator the tappet 17 begins its intermittent action on the oscillatory member immediately upon the rotation of the conductor 1, so that instead of its moving to the maximum degree in a single step, with the resultant excesses in vibration due to its momentum, it is intermittently retarded, and therefore moves to the maximum under a gradual step-by-step action and affords a more speedy and accurate reading of the indicator.

Having thus described my invention, what I claim, and desire to secure by Letters Patent, is—

1. In an indicator, the combination with an oscillatory member and operating means therefor, said member having a normal position of rest, an intermittently-acting damping device for said member, and automatic means for actuating said device.

2. In combination with an oscillatory indicating member and electrical means for oscillating said member, a biasing device for said member, an intermittently-acting damping device for the oscillatory member, and automatic means for operating the damping device.

3. In combination with a magnet and a conductor in its field, one of the elements being movable relatively to the other, an oscillatory member influenced by the drag of the field, and intermittently-acting damping means for said member.

4. In combination with a magnet and a conductor in its field, one of the elements being movable relatively to the other, an oscillatory member influenced by the drag of the field, and mechanical damping means acting intermittently on the oscillatory member.

5. In combination with a magnet and a conductor in its field, one of the elements being movable relatively to the other, an oscillatory member influenced by the drag of the field, mechanical damping means operating on said member, said damping means being actuated by the moving element.

6. In combination with an oscillatory member of a magnetic speed-indicator, a damping device comprising an intermittently-movable member acting radially on the oscillatory member, and a rotary eccentric operatively connected to effect such intermittent movement.

7. In combination, a permanent magnet, a conductor moving in its field, an oscillatory member influenced by the drag of the field, an automatically-acting tappet operating intermittently on said member and a rotary eccentric for operating said tappet.

In witness whereof I have hereunto set my hand this 24th day of December, 1902.

SIMON B. STORER.

Witnesses:
H. E. CHASE,
HOWARD P. DENISON.